United States Patent
Ouyang et al.

(10) Patent No.: US 9,407,447 B2
(45) Date of Patent: Aug. 2, 2016

(54) MULTICAST MESSAGE REPLICATION METHOD AND DEVICE

(71) Applicant: ZTE CORPORATION, Shenzhen, Guangdong Province (CN)

(72) Inventors: Fan Ouyang, Shenzhen (CN); Changsheng Chen, Shenzhen (CN); Jianli Liu, Shenzhen (CN); Bian Wu, Shenzhen (CN); Hengqi Liu, Shenzhen (CN); Fengbo Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 22 days.

(21) Appl. No.: 14/418,980

(22) PCT Filed: Jul. 31, 2013

(86) PCT No.: PCT/CN2013/080512
§ 371 (c)(1),
(2) Date: Feb. 2, 2015

(87) PCT Pub. No.: WO2014/019511
PCT Pub. Date: Feb. 6, 2014

(65) Prior Publication Data
US 2015/0215132 A1    Jul. 30, 2015

(30) Foreign Application Priority Data
Aug. 3, 2012   (CN) .......................... 2012 1 0274379

(51) Int. Cl.
*H04L 12/18*   (2006.01)
*H04L 12/931*   (2013.01)

(52) U.S. Cl.
CPC .............. *H04L 12/18* (2013.01); *H04L 12/189* (2013.01); *H04L 49/201* (2013.01)

(58) Field of Classification Search
CPC ...... H04L 49/201; H04L 12/18; H04L 12/189
See application file for complete search history.

(56) References Cited

U.S. PATENT DOCUMENTS

| | | | |
|---|---|---|---|
| 5,898,687 | A | 4/1999 | Harriman et al. |
| 7,822,051 | B1 | 10/2010 | Perelstain et al. |

(Continued)

FOREIGN PATENT DOCUMENTS

| | | |
|---|---|---|
| CN | 1411211 A | 4/2003 |
| CN | 101414973 A | 4/2009 |
| CN | 102821045 A | 12/2012 |

*Primary Examiner* — Brian D Nguyen
(74) *Attorney, Agent, or Firm* — Ling Wu; Stephen Yang; Ling and Yang Intellectual Property

(57) ABSTRACT

A multicast message replication method and apparatus are provided. The method includes: step 1. storing a received message in a message cache module, and an inter-port replication module acquiring a cache address of the message, inter-port replication information of the message, and inner-port replication information of the message, replicating the cache address according to the inter-port replication information, and transmitting the replicated cache address and the corresponding inner-port replication information to a port queue module to be stored; step 2. a port scheduling module scheduling the cache address of the port queue module, and under the scheduling by the port scheduling module, the port queue module outputting a cache address for which message replication needs to be performed according to the stored corresponding inner-port replication information; step 3. the message cache module reading a corresponding message according to the cache address output by the port queue module and outputting.

18 Claims, 6 Drawing Sheets

(56) References Cited

U.S. PATENT DOCUMENTS

| | | |
|---|---|---|
| 2004/0008716 A1 | 1/2004 | Stiliadis |
| 2004/0078618 A1* | 4/2004 | Moser ............... G06F 9/526 714/3 |
| 2004/0258003 A1* | 12/2004 | Kokot ............... H04L 12/185 370/254 |
| 2005/0152370 A1* | 7/2005 | Meehan ............ H04L 12/185 370/393 |
| 2006/0165111 A1 | 7/2006 | Varma |
| 2011/0262138 A1* | 10/2011 | He ............... H04Q 11/0067 398/66 |
| 2012/0030170 A1* | 2/2012 | Bernbo ............ G06F 17/30215 707/634 |
| 2012/0278898 A1* | 11/2012 | Nguyen ............... G06F 21/10 726/27 |
| 2012/0294193 A1* | 11/2012 | Chen ............... H04L 12/4633 370/255 |

\* cited by examiner

MULTICAST MESSAGE REPLICATION METHOD AND DEVICE

TECHNICAL FIELD

The present document relates to multicast message replication technology, and in particular, to a multicast message replication method and apparatus.

BACKGROUND OF THE RELATED ART

In the data communication field, with the rise of the network protocol television (IPTV), the video conference, and the network radio station, more and more manufacturers and services begin to support an application of multicast message. The multicast is to realize the data transmission mode from a simple point to multiple points in the network, which can save the network bandwidth, reduce the network load, and improve the transmission efficiency of the network.

In the current exchange system of the router and the switchboard, the replication of the multicast message is achieved by the uplink side and downlink side together. At the uplink side, the replication among different line cards is realized by the exchange network, and the amount of replication is limited; while at the downlink side, it is to replicate within the line card, which needs to perform the replication with large data volume. When the multicast replication is performed in the downlink side line card, if the messages queue up in the output port directly after the replication is finished by adopting the traditional mode, it will consume a large amount of memory resources, and is unfavorable to perform the replication with large data volume. Meanwhile its structure is unfavorable to the expansion of the number of ports as well, and the replication among the ports will interfere with each other as well.

SUMMARY

In order to solve the problem that a large amount of memory resources will be consumed when the multicast replication is performed in the downlink side line card in the related art, the embodiment of the present document provides a multicast message replication method and apparatus.

In order to solve the above-mentioned technical problem, the following technical scheme is adopted:

A multicast message replication method, comprising:

step 1. storing a received message in a message cache module, and an inter-port replication module acquiring a cache address of the message, inter-port replication information of the message, and inner-port replication information of the message, replicating the cache address according to the inter-port replication information, and transmitting the replicated cache address and the corresponding inner-port replication information to a port queue module to be stored;

step 2. a port scheduling module scheduling the cache addresses of the port queue module, and under scheduling by the port scheduling module, the port queue module outputting a cache address for which message replication needs to be performed according to the stored corresponding inner-port replication information; and step 3. the message cache module reading a corresponding message according to the cache address output by the port queue module and outputting the corresponding message.

Alternatively, the step of the inter-port replication module acquiring the cache address of the message, the inter-port replication information of the message and the inner-port replication information of the message comprises:

the inter-port replication module acquiring the cache address of the message and a multicast identification ID of the message from the message cache module;

acquiring the inter-port replication information and the inner-port replication information from a preset multicast replication table according to the multicast identification ID, wherein, the multicast replication table comprises inter-port replication information and inner-port replication information corresponding to every multicast ID, the inter-port replication information comprises: a port to which every cache address needs to be replicated; and the inner-port replication information comprises: a number of copies of the message required to be replicated in every port according to every cache address.

Alternatively, the step of the port queue module outputting a cache address for which message replication needs to be performed according to the stored corresponding inner-port replication information under the scheduling by the port scheduling module comprises:

step 21. under the scheduling by the port scheduling module, the port queue module outputting the cache address corresponding to the message required to be replicated currently, and updating the corresponding inner-port replication information in the port queue module;

step 22. the port queue module judging whether the replication for the message required to be replicated in a port corresponding to the cache address is completed according to the inner-port replication information; if not, then continuing outputting the cache address corresponding to the message required to be replicated currently, until the replication for the message required to be replicated currently is completed; and if yes, proceeding to step 23; and step 23. if the port queue module determines that the replication for the message required to be replicated currently is already completed, executing steps 21-23, until replication for messages of all ports is completed.

Alternatively, a mutually-independent port queue corresponding to every port is set in the port queue module, the port queue module adopts a list structure to store the cache address received by the corresponding port queue and the number of copies of the message required to be replicated according to the cache address, and the port queue module comprises: a queue head, a queue body, and a queue end; wherein, the queue head stores a queue head pointer of every port queue, the cache address corresponding to the message required to be replicated currently, and the number of the copies of the message required to be replicated according to the cache address; the queue head pointer is used for storing an address of a next cache address in the queue of the present port; the queue body stores, besides the cache address corresponding to the message required to be replicated currently and the number of the copies of the message required to be replicated according to the cache address, another cache address received by every port queue and a number of copies of the message required to be replicated according to that cache address; and the queue end stores a queue end pointer of every port queue, and the queue end pointer indicates a write address by which the other received cache address and the number of the copies of the message required to be replicated according to that cache address are written into the corresponding queue body in every port queue.

Alternatively, the step of transmitting the replicated cache address and the corresponding inner-port replication information to the port queue module to be stored comprises that:

at first the port queue module writes the queue head pointer, the cache address corresponding to the message required to be replicated currently, and the number of the copies of the message required to be replicated according to the cache address of every port queue into the queue head, writes the queue end pointer of every port queue into the queue end, and writes the other received cache address of every port queue and the number of the copies of the message required to be replicated according to that cache address into the queue body according to the write address indicated by the queue end pointer.

Alternatively, the step of the port queue module outputting the cache address corresponding to the message required to be replicated currently, and updating the corresponding inner-port replication information in the port queue module under the scheduling by the port scheduling module comprises:

under the scheduling by the port scheduling module, the port queue module reading the cache address corresponding to the message required to be replicated currently stored in the port queue from the queue head for outputting, updating the number of the copies of the message required to be replicated according to the cache address every time the cache address de-queues, in a case that it is determined that the replication for the current message required to be replicated is already completed according to the number of the copies of the message required to be replicated according to the cache address, reading a next cache address and a number of copies of the message required to be replicated according to that cache address from the queue body according to the queue head pointer of the port queue, and writing into the port queue of the queue head.

Alternatively, the method further comprises:

a cache address recycling module acquiring a total number of the copies of the message corresponding to every cache address through the inter-port replication module, and updating a number of the copies of the message which have already been replicated every time the cache address de-queues; and the cache address recycling module comparing the total number of the copies of the message with the number of the copies of the message which have already been replicated, if equal, recycling a cache address corresponding to that message for which the replication is completed, notifying the cache address which is already recycled to the message cache module and clearing the number of the copies of that message for which the replication is completed as 0.

A multicast message replication apparatus comprises a message cache module, an inter-port replication module, a port queue module and a port scheduling module, wherein:

the message cache module is configured to: store a received message, and read a corresponding message according to a cache address output by the port queue module and output;

the inter-port replication module is configured to: acquire a cache address of the message, inter-port replication information of the message, and inner-port replication information of the message, replicate the cache address according to the inter-port replication information, and transmit the replicated cache address and the corresponding inner-port replication information to the port queue module;

the port queue module is configured to: store the received cache address and the corresponding inner-port replication information, output a cache address for which message replication needs to be performed according to the stored corresponding inter-port replication information under scheduling by the port scheduling module; and the port scheduling module is configured to: schedule the cache addresses of the port queue module.

Alternatively, the inter-port replication module is configured to acquire the cache address of the message, the inter-port replication information of the message and the inner-port replication information of the message according to the following mode:

acquiring the cache address of the message and a multicast identification ID of the message from the message cache module; and acquiring the inter-port replication information and the inner-port replication information from a preset multicast replication table according to the multicast identification ID;

wherein, the multicast replication table comprises inter-port replication information and inner-port replication information corresponding to every multicast ID;

the inter-port replication information comprises: a port to which every cache address needs to be replicated;

the inner-port replication information comprises: a number of copies of the messages required to be replicated in every port according to every cache address.

Alternatively, the port queue module comprises an outputting submodule and a judgment submodule, wherein:

the outputting submodule is configured to: under the scheduling by the port scheduling module, output the cache address corresponding to the message required to be replicated currently, and update the corresponding inner-port replication information in the port queue module;

the judgment submodule is configured to: judge whether the replication for the message required to be replicated in a port corresponding to the cache address is completed according to the replication information; if not, continue calling the outputting submodule to output the cache address corresponding to the message required to be replicated currently until the replication for the message required to be replicated currently is completed; and if yes, call the outputting submodule and the judgment submodule until replication for messages of all ports is completed.

Alternatively, a mutually-independent port queue corresponding to every port is set in the port queue module, the port queue module adopts a list structure to store the cache address received by the corresponding port queue and the number of copies of the message required to be replicated according to the cache address, and the port queue module comprises: a queue head, a queue body, and a queue end; wherein, the queue head stores a queue head pointer of every port queue, the cache address corresponding to the message required to be replicated currently, and the number of the copies of the message required to be replicated according to the cache address; the queue head pointer is used for storing an address of a next cache address in the queue of the present port; the queue body stores, besides the cache address corresponding to the message required to be replicated currently and the number of the copies of the message required to be replicated according to the cache address, another cache address received by every port queue and a number of copies of the message required to be replicated according to that cache address; and the queue end stores a queue end pointer of every port queue, and the queue end pointer indicates a write address by which the other received cache address and the number of the copies of the message required to be replicated according to that cache address are written into the corresponding queue body in every port queue.

Alternatively, the port queue module further comprises a storage submodule, wherein:

the storage submodule is configured to: at first write the queue head pointer, the cache address corresponding to the message required to be replicated currently, and the number of the copies of the message required to be replicated according to the cache address of every port queue into the queue head, write the queue end pointer of every port queue into the queue end, and write the other received cache address of every port queue and the number of the copies of the message required to be replicated according to that cache address into the queue body according to the write address indicated by the queue end pointer.

Alternatively, the outputting submodule is configured to output the cache address corresponding to the message required to be replicated currently and update the corresponding inner-port replication information in the port queue module under the scheduling by the port scheduling module according to the following mode:

under the scheduling by the port scheduling module, reading the cache address corresponding to the message required to be replicated currently stored in the port queue from the queue head for outputting, updating the number of the copies of the message required to be replicated according to the cache address every time the cache address de-queues, in a case that it is determined that the replication for the current message required to be replicated is already completed according to the number of the copies of the message required to be replicated according to the cache address, reading a next cache address and a number of copies of the message required to be replicated according to that cache address from the queue body according to the queue head pointer of the port queue, and writing into the port queue of the queue head.

Alternatively, the apparatus further comprises a cache address recycling module, wherein:

the cache address recycling module is configured to: acquire a total number of the copies of the message corresponding to every cache address through the inter-port replication module, and update a number of copies of the message which have already been replicated every time the cache address de-queues; and compare the total number of the copies of the messages with the number of the copies of the message which have already been replicated, if equal, then recycle a cache address corresponding to that message for which the replication is completed, notify the cache address which is already recycled to the message cache module and clear the number of the copies of that message for which the replication is completed as 0.

The above-mentioned technical scheme adopts the two-stage replication mode, firstly the first stage performs the inter-port replication, and then the second stage performs the inner-port replication, to solve the problem that a large amount of memory resources will be consumed when the multicast replication is performed in the downlink side line card in the related art, which can realize the replication of the large data amount of the multicast message and can realize the expansion of the number of ports and the increase and decrease of the number of the replication copies conveniently.

PREFERRED EMBODIMENTS OF THE INVENTION

In order to solve the problem that a large amount of memory resources will be consumed when the multicast replication is performed in the downlink side line card in the related art, the embodiment of the present document provides a multicast message replication method and apparatus, the present document will be described in detail with reference to the accompanying drawings and embodiments hereinafter. It should be understood that, the embodiments illustrated hereinafter are used to describe and explain the present document only, rather than constituting an inappropriate limitation on the present document.

Apparatus Embodiment

Figure 1:
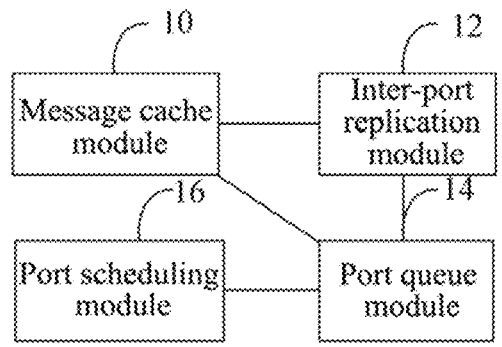
FIG. 1 is a structure of a multicast message replication apparatus of an embodiment of the present document.

According to an embodiment of the present document, a multicast message replication apparatus is provided. FIG. 1 is a structure of a multicast message replication apparatus of an embodiment of the present document. As shown in FIG. 1, the multicast message replication apparatus according to the present document includes a message cache module 10, an inter-port replication module 12, a port queue module 14 and a port scheduling module 16. Every module of the embodiment of the present document is explained in detail hereinafter.

The message cache module 10 is configured to: store a received message, and read a corresponding message according to a cache address output by the port queue module 14 and output.

Alternatively, in practical application, the message cache module 10 includes a high-capacity random access memory (RAM), used for storing the entity of the input message during message inputting; and reading the RAM for outputting the message according to the cache address when outputting the message.

The inter-port replication module 12 is configured to: acquire a cache address of the message, inter-port replication information of the message, and inner-port replication information of the message, replicate the cache address according to the inter-port replication information (that is, the inter-port replication), and transmit the replicated cache address and the corresponding inner-port replication information to the port queue module 14.

The above-mentioned inter-port replication is to finish the first stage replication of the message, that is, to perform the inter-port replication of the input message, and output the cache address corresponding to the message to the port queue.

The inter-port replication module 12 is configured to acquire the cache address of the message and a multicast Identity (ID) of the message from the message cache module 10; and acquire the inter-port replication information and the inner-port replication information from a preset multicast replication table according to the multicast identification ID; wherein, the multicast replication table comprises inter-port replication information and inner-port replication information corresponding to every multicast ID; the inter-port replication information comprises: a port to which every cache address needs to be replicated; and the inner-port replication information comprises: a number of copies of the messages required to be replicated in every port according to every cache address.

Figure 2:
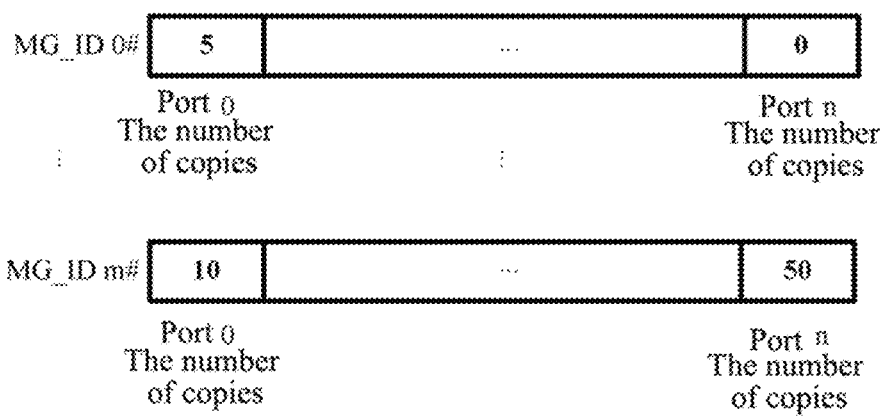
FIG. 2 is a structure of a multicast replication table of an embodiment of the present document.

FIG. 2 is a structure of a multicast replication table of an embodiment of the present document. As shown in FIG. 2, the multicast replication table is made up of multiple table items, and each table item is corresponding to one multicast IDs (MG_ID). Inside of each MG_ID table item, it is divided into several parts according to the number of ports, and each part represents the number of corresponding replication copies in one port. If the number of copies is 0, then it represents that the port does not need to perform replication. The inter-port replication module 12 can inquire that to which ports the cache address of the message is required to be replicated according to the MG_ID and how many copies are required to be replicated in each port. If the numbers of the copies of all ports (MG_ID) are added, the total number of the copies can be obtained.

The port queue module 14 is configured to: store the received cache address and the corresponding inner-port replication information, output a cache address for which message replication needs to be performed according to the stored corresponding inter-port replication information under scheduling by the port scheduling module 16.

The port queue module 14 needs to perform the second stage replication of the message, and to perform the inner-port message replication once again for the cache address for which inter-port replication is completed. Inside the port queue module 14, it is to queue according to the port, and every port queue is mutually independent.

Alternatively, the port queue module 14 specifically includes an outputting submodule and a judgment submodule, wherein:

the outputting submodule is configured to: under the scheduling by the port scheduling module 16, output the cache address corresponding to the message required to be replicated currently, and update the corresponding inner-port replication information in the port queue module 14; and the judgment submodule is configured to: make a judgment on the inner-port replication information corresponding to the cache address; if the replication for the message required to be replicated currently is not completed, then continue calling the outputting submodule to output the cache address corresponding to the message required to be replicated currently, until the replication for the message required to be replicated currently is completed; and if it is determined that the replication for the message required to be replicated currently is completed, then call the outputting submodule and the judgment submodule to perform the inner-port replication of the next port, until the replication for messages of all ports is completed.

Alternatively, a mutually-independent port queue corresponding to every port is set in the port queue module 14, the port queue module 14 adopts a list structure to store the cache address received by the corresponding port queue and the number of copies of the messages required to be replicated according to the cache address, and the port queue module 14 includes: a queue head, a queue body, and a queue end; wherein, the queue head stores a queue head pointer, the cache address corresponding to the message required to be replicated currently, and the number of the copies of the messages required to be replicated according to the cache address of every port queue; the queue head pointer is used for storing an address of a next cache address in the queue of the present port; the queue body stores, besides the cache address corresponding to the message required to be replicated currently and the number of the copies of the messages required to be replicated according to the cache address, another cache address received by every port queue and the number of the copies of the messages required to be replicated according to the cache address; and the queue end stores a queue end pointer of every port queue, and the queue end pointer indicates a write address by which the other received cache address and the number of the copies of the message required to be replicated according to the cache address are written into the corresponding queue body in every port queue.

Alternatively, based on the above-mentioned description, the port queue module 14 further includes a storage submodule, wherein the storage submodule is configured to: at first write the queue head pointer, the cache address corresponding to the message required to be replicated currently, and the number of the copies of the messages required to be replicated according to the cache address of every port queue into the queue head, write the queue end pointer of every port queue into the queue end, and write the other received cache address of every port queue and the number of the copies of the messages required to be replicated according to the cache address into the queue body according to the write address indicated by the queue end pointer.

The above-mentioned outputting submodule is configured to: under the scheduling by the port scheduling module 16, read the cache address corresponding to the message required to be replicated currently stored in the port queue from the queue head for outputting, updating the number of the copies of the message required to be replicated according to the cache address every time the cache address de-queues, in a case that it is determined that the replication for the current message required to be replicated is already completed according to the number of the copies of the message required to be replicated according to the cache address, read a next cache address and the number of the copies of the messages required to be replicated according to that cache address from the queue body according to the queue head pointer of the port queue, and writing into the port queue of the queue head.

Figure 3:
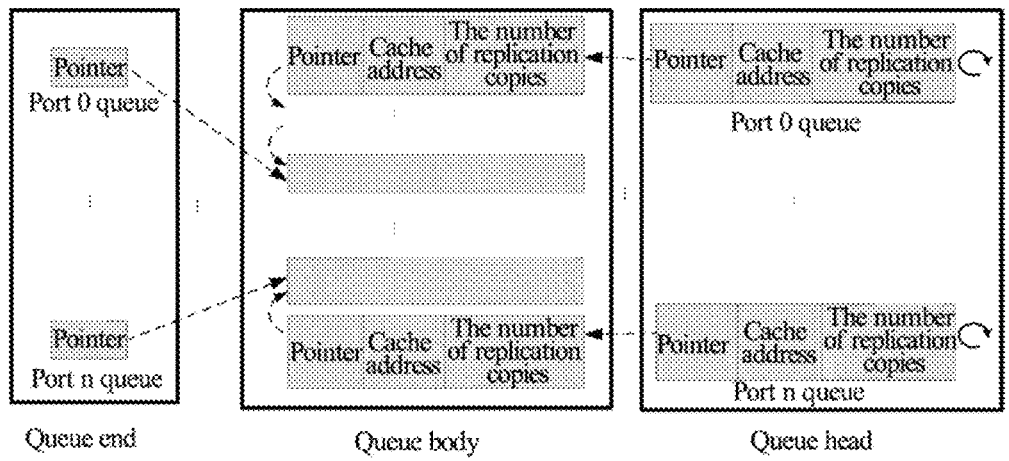
FIG. 3 is a structure of a port queue module of an embodiment of the present document.

FIG. 3 is a structure of a port queue module 14 of an embodiment of the present document. As shown in FIG. 3, the port queue module 14 stores every port queue with the list structure, which should save the storage resources compared with the FIFO structure. The overall structure of the port queue module 14 is made up of three parts, the queue end, the queue body and the queue head. Wherein the queue head stores the queue head pointer, the cache address corresponding to the message and the number of the copies of the messages to be replicated of every the port queue. The pointer is used for storing the address of the next data at the port queue in that queue, and used for linking the data in the queue together; the cache address is an address of the message data in the message cache module 10; and the number of the replication copies is the total number of copies of the message required to be replicated in the port. The content stored in the queue body is similar with that in the queue head, and the queue end only stores the pointer.

When the queue en-queues, it is to write into the queue head first; after it is to write into the queue head, it is to write into the queue body through the pointer in the queue end. When the queue de-queues, it is always to read the cache address from the queue head for outputting. Every time de-queuing, the number of replication copies is decreased by 1, until 0 is obtained, which represents that the replication for the message is completed in the port. Only when the number of the replication copies is decreased to 0, the next data are read from the queue body and written back into the queue head, the update operation of the queue is completed. Before the replication is completed, the current message in the queue head is always adopted for outputting, to realize the inner-port replication of the message.

The port scheduling module 16 is configured to: schedule the cache addresses of the port queue module 14.

Alternatively, the port scheduling module 16 finishes the scheduling of the port queue, and selects a message from every port queue for scheduling and outputting.

Alternatively, in the embodiment of the present document, in order to enable the cache address to be recycled quickly, the above-mentioned apparatus further includes a cache address recycling module, configured to: acquire a total number of copies of the message corresponding to every cache address through the inter-port replication module 12, and update the number of copies of the message which have already been replicated every time the cache address de-queues; and compare the total number of the copies of the message with the number of the copies of the message which have already been replicated, if they are equal, then recycle a cache address corresponding to that message for which the replication is completed, notify the cache address which is already recycled to the message cache module 10 and clear the number of copies of that message for which the replication is completed as 0.

As described above, inside of the cache address recycling module, the total number of the replication copies and the number of already de-queued replication copies corresponding to every cache address are stored, and the cache address is released according to the completion situation of the message replication, to realize the address recycling.

Figure 4:
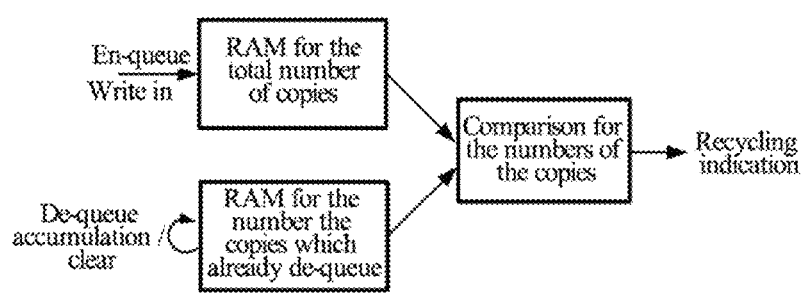
FIG. 4 is an internal structure of a cache address recycling module of an embodiment of the present document.

FIG. 4 is an internal structure of a cache address recycling module of an embodiment of the present document. As shown in FIG. 4, in the cache address recycling module, there are two RAMs for storing the numbers of the copies, a RAM for the total number of copies and a RAM for the number the copies which already de-queue. The address depths of these two RAMs are the same as the address depths corresponding to the message cache module 10.

The RAM for the total number of the copies stores the information of the total number of the replication copies corresponding to the cache address, which is acquired through the inter-port replication module 12. When the inter-port replication module 12 inquires the multicast replication table, the numbers of the replication copies corresponding to each port corresponding to the message MG_ID are added, to acquire the total number of the replication copies of the inter-port+the inner-port.

The RAM for the number the copies which already de-queue stores the information of the copies which already de-queue corresponding to the cache address, and its initial value is 0. Before the replication for the total copies is completed, when the port scheduling module 16 outputs one cache address, the number of the copies which already de-queue corresponding to the relevant cache address in the RAM for the number the copies which already de-queue is added by 1; only after the replication for the total copies is completed, then the number value is cleared as 0. The number comparison is used for comparing the RAM for the total number of the copies and the RAM for the number the copies which already de-queue; only the two are equal, then it just represents that the replication of the inter-port+the inner-port is already completed.

The above-mentioned technical schemes of the embodiments of the present document are described in detail with reference to the accompanying drawings hereinafter.

Figure 5:
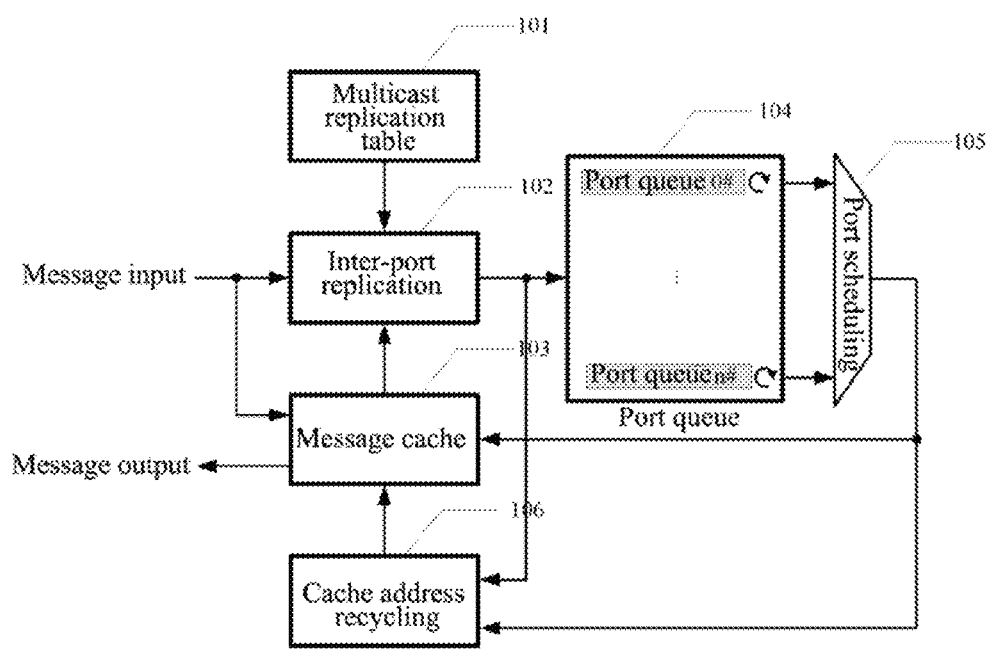
FIG. 5 is a detailed structure of a multicast message replication apparatus of an embodiment of the present document.

FIG. 5 is a detailed structure of a multicast message replication apparatus of an embodiment of the present document. As shown in FIG. 5, the multicast message replication apparatus according to the present document includes: a multicast replication table 101, an inter-port replication module 102, a message cache module 103, a port queue module 104, a port scheduling module 105 and a cache address recycling module 106.

Figure 6:
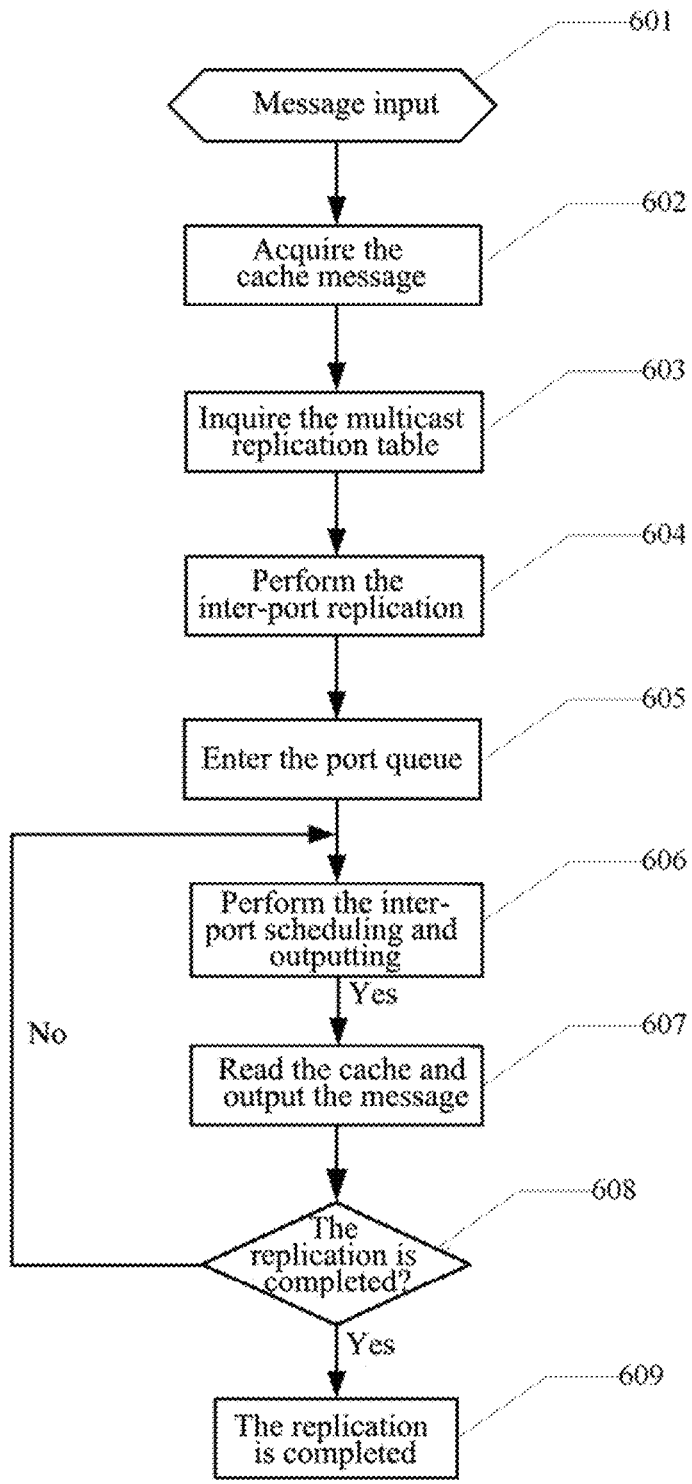
FIG. 6 is a flow chart of detailed processing by a multicast message replication apparatus of an embodiment of the present document.

FIG. 6 is a flow chart of detailed processing by a multicast message replication apparatus of an embodiment of the present document. As shown in FIG. 6, based on the multicast message replication apparatus as shown in FIG. 5, it includes the following processing.

In step 601, the multicast message replication apparatus receives the input message. The message entity is stored in the message cache module 103, and the MG_ID of the message is transmitted to the inter-port replication module 102.

In step 602, the inter-port replication module 102 acquires the cache address corresponding to the message entity from the message cache module 103.

In step 603, the inter-port replication module 102 inquires the multicast replication table 101 according to the MG_ID, and acquires the inter-port and inner-port replication information of the message.

In step 604, the inter-port replication module 102 performs the inter-port replication for the cache address corresponding to the message, and transmits the replicated data and the number of replication copies required by the second stage replication to the port queue module 104 sequentially according to the sequence of the port number.

In step 605, the port queue module 104 queues the received cache addresses in sequential order, and stores the number of replication copies of each message in the port.

In step 606, scheduling and outputting among the ports are performed by the port scheduling module 105.

In step 607, the message cache module 103 reads the message entity through the cache address sent out by the port scheduling module 105 and output it.

In step 608, it is to determine the number of the copies of the message which are left to be replicated in the port queue module 104; if the number of the copies which are left to be replicated is greater than 1, then steps 606 and 607 are repeatedly executed, and the scheduling and outputting are continued to be performed for the current message; until the number of the copies which are left to be replicated is 0, which represents that the replication is finished, and step 609 is to be executed.

In step 609, by the time the replication for the message of every port in the port queue module 104 is completed, the entire replication is over.

Figure 7:
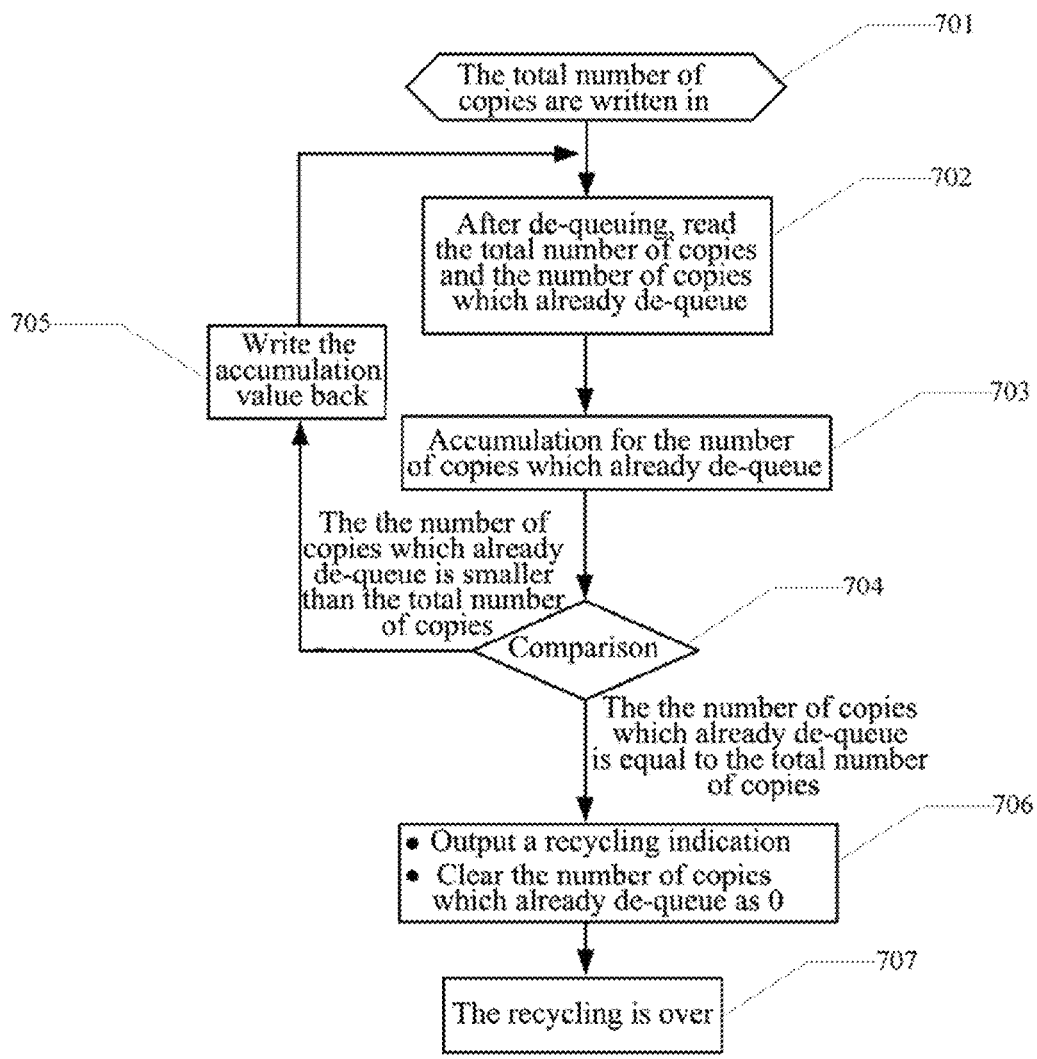
FIG. 7 is a flow chart of recycling a cache address of an embodiment of the present document.

FIG. 7 is a flow chart of recycling a cache address of an embodiment of the present document. As shown in FIG. 7, by combining with FIG. 5, it includes the following processing.

In step 701, information of the total number of copies is acquired through the inter-port replication module 102, and the total number of copies is written into the RAM for the total number of the copies.

In step 702, after the port scheduling module 105 performs the message de-queuing, the information of the number of copies corresponding to the current cache address is read from the RAM for the total number of the copies and the RAM for the number the copies which already de-queue.

In step 703, the read number of replication copies which already de-queue is added by 1.

In step 704, the number of replication copies which already de-queue obtained after accumulation is compared with the total number of replication copies; if the two are same, then it represents that the cache address can be recycled, and step 706 is executed; if the number of replication copies which already de-queue is smaller than the total number of replication copies, then it represents that the recycling is not finished, and step 705 is executed.

In step 705, during the stage that the recycling is not finished, the number of copies which already de-queue obtained after accumulation is written back to the RAM for the number the copies which already de-queue. Subsequently, steps 702 and 703 are repeatedly executed, to continue to schedule the de-queuing and accumulating the number of copies.

In step 706, after the recycling is finished, a recycling indication is output to the message cache module 103, and the number of copies in the RAM for the number the copies which already de-queue is cleared as 0 at the same time.

In step 707, the whole recycling process of the cache address is over.

In sum, the embodiment of the present document adopts the two-stage replication mode, which can realize the replication of the multicast message with large data volume. The replication structure of the multicast message replication apparatus of the embodiment of the present document is clear; firstly the first stage performs the inter-port replication, and then the second stage performs the inner-port replication, which can realize the expansion of the number of ports and the increase and decrease of the number of replication copies conveniently. In addition, as for the management of the port queue, it is realized by adopting the link table mode and the memory resources are saved. Meanwhile, each port adopts a mode in which an identical message de-queues more than once to realize replicating, which further simplifies the use of the queue resources. For the recycling of the cache resources, 2 RAMs are used to store the total number of replication copies and the number the copies which already de-queue respectively, which solves the recycling problem of the cache address effectively.

Method Embodiment

Figure 8:
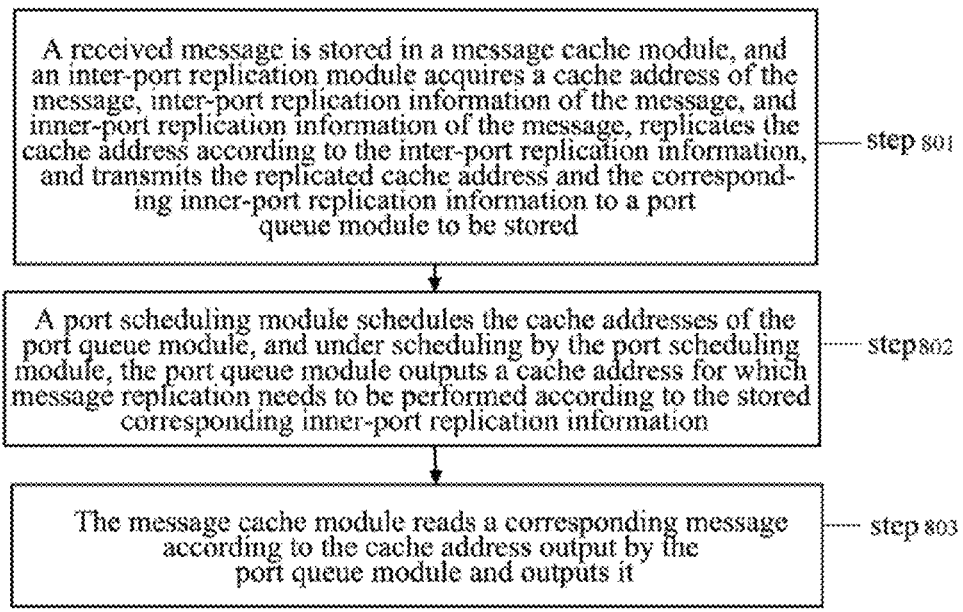
FIG. 8 is a flow chart of a multicast message replication method of an embodiment of the present document.

Based on the multicast message replication apparatus in the above-mentioned method embodiment, according to the embodiment of the present document, a multicast message replication method is provided. FIG. 8 is a flow chart of a multicast message replication method of an embodiment of the present document. As shown in FIG. 8, the multicast message replication method according to the embodiment of the present document includes the following processing.

In step 801, a received message is stored in a message cache module, and an inter-port replication module acquires a cache address of the message, inter-port replication information of the message, and inner-port replication information of the message, replicates the cache address according to the inter-port replication information (that is, the inter-port replication), and transmits the replicated cache address and the corresponding inner-port replication information to a port queue module to be stored.

The above-mentioned inter-port replication is to finish the first stage replication of the message, that is, to perform the inter-port replication of the input message, and output the cache address corresponding to the message to the port queue.

Alternatively, in step 801, the inter-port replication module acquiring the cache address of the message, the inter-port replication information of the message and the inner-port replication information of the message specifically includes: 1. the inter-port replication module acquiring the cache address of the message and a multicast identification ID of the message from the message cache module; 2. acquiring the inter-port replication information and the inner-port replication information from a preset multicast replication table according to the multicast identification ID, wherein, the multicast replication table comprises inter-port replication information and inner-port replication information corresponding to every multicast ID, the inter-port replication information comprises: a port to which every cache address needs to be replicated; and the inner-port replication information comprises: the number of copies of the message required to be replicated in every port according to every cache address.

FIG. 2 is a structure of a multicast replication table of an embodiment of the present document. As shown in FIG. 2, the multicast replication table is made up of multiple table items, and each table item is corresponding to one multicast IDs (MG_ID). Inside of each MG_ID table item, it is divided into several parts according to the number of ports, and each part represents the number of corresponding replication copies in one port. If the number of copies is 0, then it represents that the port does not need to perform replication. The inter-port replication module 12 can inquire that to which ports the cache address of the message is required to be replicated according to the MG_ID and how many copies are required to be replicated in each port. If all the numbers of the copies of all ports (MG_ID) are added, the total number of the copies can be obtained.

In step 802, a port scheduling module schedules the cache addresses of the port queue module, and under scheduling by the port scheduling module, the port queue module outputs a cache address for which message replication needs to be performed according to the stored corresponding inner-port replication information.

The port queue module needs to perform the second stage replication of the message, and to perform the inner-port message replication once again for the cache address for which inter-port replication is completed. Inside the port queue module, it is to queue according to the port, and every port queue is mutually independent.

In step 802, the port queue module outputting a cache address for which message replication needs to be performed according to the stored corresponding inner-port replication information under the scheduling by the port scheduling module specifically includes the following steps:

in step 8021, under the scheduling by the port scheduling module, the port queue module outputs the cache address corresponding to the message required to be replicated currently, and updates the corresponding inner-port replication information in the port queue module;

in step 8022, the port queue module judges the inner-port replication information corresponding to the cache address; if the replication for the message required to be replicated currently is not completed, then it continues outputting the cache address corresponding to the message required to be replicated currently, until the replication for the message required to be replicated currently is completed;

in step 8023, if the port queue module determines that the replication for the message required to be replicated currently is already completed, steps 8021-8023 are executed, to perform the inner-port replication of the next port, until replication for messages of all ports is completed.

Alternatively, a mutually-independent port queue corresponding to every port is set in the port queue module, the port queue module adopts a list structure to store the cache address received by the corresponding port queue and the number of copies of the messages required to be replicated according to the cache address, and the port queue module 14 includes: a queue head, a queue body, and a queue end; wherein, the queue head stores a queue head pointer, the cache address corresponding to the message required to be replicated currently, and the number of the copies of the messages required to be replicated according to the cache address of every port queue; the queue head pointer is used for storing an address of a next cache address in the queue of the present port; the queue body stores, besides the cache address corresponding to the message required to be replicated currently and the number of the copies of the messages required to be replicated according to the cache address, another cache address received by every port queue and the number of the copies of the messages required to be replicated according to the cache address; and the queue end stores a queue end pointer of every port queue, and the queue end pointer indicates a write address by which the other received cache address and the number of the copies of the message required to be replicated according to the cache address are written into the corresponding queue body in every port queue.

Therefore, when the port queue module stores the replicated cache address and the corresponding inner-port replication information, at first the port queue module writes the queue head pointer, the cache address corresponding to the message required to be replicated currently, and the number of the copies of the message required to be replicated according to the cache address of every port queue into the queue head, writes the queue end pointer of every port queue into the queue end, and writes the other received cache address of every port queue and the number of the copies of the message required to be replicated according to the cache address into the queue body according to the write address indicated by the queue end pointer.

The port queue module outputting the cache address corresponding to the message required to be replicated currently, and updating the corresponding inner-port replication information in the port queue module under the scheduling by the port scheduling module specifically includes: under the scheduling by the port scheduling module, the port queue module reading the cache address corresponding to the message required to be replicated currently stored in the port queue from the queue head for outputting, updating the number of the copies of the message required to be replicated by the cache address every time the cache address de-queues, in a case that it is determined that the replication for the current message required to be replicated is already completed according to the number of the copies of the message required to be replicated according to the cache address, reading a next cache address and the number of the copies of the messages required to be replicated according to that cache address from the queue body according to the queue head pointer of the port queue, and writing into the port queue of the queue head.

FIG. 3 is a structure of a port queue module of an embodiment of the present document. As shown in FIG. 3, the port queue module 14 stores every port queue with the list structure, which should save the storage resources compared with the FIFO structure. The overall structure of the port queue module 14 is made up of three parts, the queue end, the queue body and the queue head. Wherein the queue head stores the queue head pointer, the cache address corresponding to the message and the number of the copies of the messages to be replicated of every the port queue. The pointer is used for storing the address of the next data at the port queue in that queue, and used for linking the data in the queue together; the cache address is an address of the message data in the message cache module 10; and the number of the replication copies is the total number of copies of the message required to be replicated in the port. The content stored in the queue body is similar with that in the queue head, and the queue end only stores the pointer.

When the queue en-queues, it is to write into the queue head first; after it is to write into the queue head, it is to write into the queue body through the pointer in the queue end. When the queue de-queues, it is always to read the cache address from the queue head for outputting. Every time de-queuing, the number of replication copies is decreased by 1, until 0 is obtained, which represents that the replication for the message is completed in the port. Only when the number of the replication copies is decreased to 0, the next data are read from the queue body and written back into the queue head, the update operation of the queue is completed. Before the replication is completed, the current message in the queue head is always adopted for outputting, to realize the inner-port replication of the message.

In step 803, the message cache module reads a corresponding message according to the cache address output by the port queue module and outputs it.

Alternatively, the port scheduling module finishes the scheduling of the port queue, and selects a message from every port queue for scheduling and outputting.

Alternatively, the multicast message replication method according to the embodiment of the present document further includes: a cache address recycling module acquiring a total number of the copies of the message corresponding to every cache address through the inter-port replication module, and updating a number of the copies of the message which have already been replicated every time the cache address de-queues; and the cache address recycling module comparing the total number of the copies of the message with the number of the copies of the message which have already been replicated, if equal, recycling a cache address corresponding to that message for which the replication is completed, notifying the cache address which is already recycled to the message cache module and clearing the number of the copies of that message for which the replication is completed as 0.

As described above, inside of the cache address recycling module, the total number of the replication copies and the number of already de-queued replication copies corresponding to every cache address are stored, and the cache address is released according to the completion situation of the message replication, to realize the address recycling.

FIG. 4 is an internal structure of a cache address recycling module of an embodiment of the present document. As shown in FIG. 4, in the cache address recycling module, there are two RAMs for storing the numbers of the copies, a RAM for the total number of copies and a RAM for the number the copies which already de-queue. The address depths of these two RAMs are the same as the address depths corresponding to the message cache module 10.

The RAM for the total number of the copies stores the information of the total number of the replication copies corresponding to the cache address, which is acquired through the inter-port replication module 12. When the inter-port replication module 12 inquires the multicast replication table, the numbers of the replication copies corresponding to each port corresponding to the message MG_ID are added, to acquire the total number of the replication copies of the inter-port+the inner-port.

The RAM for the number the copies which already de-queue stores the information of the copies which already de-queue corresponding to the cache address, and its initial value is 0. Before the replication for the total copies is completed, when the port scheduling module 16 outputs one cache address, the number of the copies which already de-queue corresponding to the relevant cache address in the RAM for the number the copies which already de-queue is added by 1; only after the replication for the total copies is completed, then the number value is cleared as 0. The number comparison is used for comparing the RAM for the total number of the copies and the RAM for the number the copies which already de-queue; only the two are equal, then it just represents that the replication of the inter-port+the inner-port is already completed.

The above-mentioned technical schemes of the embodiments of the present document are described in detail with reference to the accompanying drawings hereinafter.

FIG. 5 is a detailed structure of a multicast message replication apparatus of an embodiment of the present document. As shown in FIG. 5, the multicast message replication apparatus according to the present document includes: a multicast replication table 101, an inter-port replication module 102, a message cache module 103, a port queue module 104, a port scheduling module 105 and a cache address recycling module 106.

FIG. 6 is a flow chart of detailed processing by a multicast message replication apparatus of an embodiment of the present document. As shown in FIG. 6, based on the multicast message replication apparatus as shown in FIG. 5, it includes the following processing.

In step 601, the multicast message replication apparatus receives the input message. The message entity is stored in the message cache module 103, and the MG_ID of the message is transmitted to the inter-port replication module 102.

In step 602, the inter-port replication module 102 acquires the cache address corresponding to the message entity from the message cache module 103.

In step 603, the inter-port replication module 102 inquires the multicast replication table 101 according to the MG_ID, and acquires the inter-port and inner-port replication information of the message.

In step 604, the inter-port replication module 102 performs the inter-port replication for the cache address corresponding to the message, and transmits the replicated data and the number of replication copies required by the second stage replication to the port queue module 104 sequentially according to the sequence of the port number.

In step 605, the port queue module 104 queues the received cache addresses in sequential order, and stores the number of replication copies of each message in the port.

In step 606, scheduling and outputting among the ports are performed by the port scheduling module 105.

In step 607, the message cache module 103 reads the message entity through the cache address sent out by the port scheduling module 105 and output it.

In step 608, it is to determine the number of the copies of the message which are left to be replicated in the port queue module 104; if the number of the copies which are left to be replicated is greater than 1, then steps 606 and 607 are repeatedly executed, and the scheduling and outputting are continued to be performed for the current message; until the number of the copies which are left to be replicated is 0, which represents that the replication is finished, and step 609 is to be executed.

In step 609, by the time the replication for the message of every port in the port queue module 104 is completed, the entire replication is over.

FIG. 7 is a flow chart of recycling a cache address of an embodiment of the present document. As shown in FIG. 7, by combining with FIG. 5, it includes the following processing.

In step 701, information of the total number of copies is acquired through the inter-port replication module 102, and the total number of copies is written into the RAM for the total number of the copies.

In step 702, after the port scheduling module 105 performs the message de-queuing, the information of the number of copies corresponding to the current cache address is read from the RAM for the total number of the copies and the RAM for the number the copies which already de-queue.

In step 703, the read number of replication copies which already de-queue is added by 1.

In step 704, the number of replication copies which already de-queue obtained after accumulation is compared with the total number of replication copies; if the two are same, then it represents that the cache address can be recycled, and step 706 is executed; if the number of replication copies which already de-queue is smaller than the total number of replication copies, then it represents that the recycling is not finished, and step 705 is executed.

In step 705, during the stage that the recycling is not finished, the number of copies which already de-queue obtained after accumulation is written back to the RAM for the number the copies which already de-queue. Subsequently, steps 702 and 703 are repeatedly executed, to continue to schedule the de-queuing and accumulating the number of copies.

In step 706, after the recycling is finished, a recycling indication is output to the message cache module 103, and the number of copies in the RAM for the number the copies which already de-queue is cleared as 0 at the same time.

In step 707, the whole recycling process of the cache address is over.

In sum, the embodiment of the present document adopts the two-stage replication mode, which can realize the replication of the multicast message with large data volume. The replication structure of the multicast message replication apparatus of the embodiment of the present document is clear; firstly the first stage performs the inter-port replication, and then the second stage performs the inner-port replication, which can realize the expansion of the number of ports and the increase and decrease of the number of replication copies conveniently. In addition, as for the management of the port queue, it is realized by adopting the link table mode and the memory resources are saved. Meanwhile, each port adopts a mode in which an identical message de-queues more than once to realize replicating, which further simplifies the use of the queue resources. For the recycling of the cache resources, 2 RAMs are used to store the total number of replication copies and the number the copies which already de-queue respectively, which solves the recycling problem of the cache address effectively.

For an exemplary purpose, the preferable embodiments of the present document are already disclosed, however the skilled in the art will realize that various kinds of improvement, addition and displacement are possible, therefore, the above embodiments are not intended to limit the scope of the present document It should be noted that in each part of the controller of the present document, the parts therein are divided logically according to its to-be-realized function, but the present document is not limited to this, and re-division or combination can be performed with respect to each part as needed, for example, some parts can be combined as a single part, or some parts can further be decomposed into more subparts.

Each component embodiment of the present document can be realized by hardware, or realized by software modules running on one or more processors, or realized by their association. Those skilled in the art should understand that some or all functions of some or all parts in the controller according to the embodiment of the present document can be realized by using the microprocessor or the digital signal processor (DSP) in practice. The present document also can be realized as device or apparatus programs (for example, the computer program and the computer program product) used for performing part or all of the method described here. Such programs for realizing the present document can be stored on the computer readable medium, or can have a form of one or more signals. Such a signal can be downloaded from the website of the Internet, or provided on the carrier signal, or provided in any other forms.

It should be noted that the above-mentioned embodiments are used to explain the present document but not limit the present document, and those skilled in the art can design the alternate embodiments without departing from the range of the attached claims. In the claims, any reference symbol located between the brackets should not be constructed as the limitation on the claims. The word "includes" does not exclude from having the component or step not listed in the claims. The word "a" or "one" in front of the component does not exclude from having multiple such components. The present document can be realized with the help of hardware including several different components and with the help of a computer with appropriate programs. In the apparatus claim which enumerates several devices, several of these devices can be embodied specifically with the same hardware item. The use of the words, first, second, and third, etc., does not represent any sequence, these words can be interpreted as names.

INDUSTRIAL APPLICABILITY

The above-mentioned technical scheme adopts the two-stage replication mode, firstly the first stage performs the inter-port replication, and then the second stage performs the inner-port replication, to solve the problem that a large amount of memory resources will be consumed when the multicast replication is performed in the downlink side line card in the related art, which can realize the replication of the large data amount of the multicast message and can realize the expansion of the number of ports and the increase and decrease of the number of the replication copies conveniently.

What we claim is:

1. A multicast message replication method, comprising:
   step 1. storing a received message in a message cache module, and an inter-port replication module acquiring a cache address of the message, inter-port replication information of the message, and inner-port replication information of the message, replicating the cache address according to the inter-port replication information, and transmitting the replicated cache address and the corresponding inner-port replication information to a port queue module to be stored;
   step 2. a port scheduling module scheduling the cache addresses of the port queue module, and under scheduling by the port scheduling module, the port queue module outputting a cache address for which message replication needs to be performed according to the stored corresponding inner-port replication information; and
   step 3. the message cache module reading a corresponding message according to the cache address output by the port queue module and outputs the corresponding message.

2. The method according to claim 1, wherein, the step of the inter-port replication module acquiring the cache address of the message, the inter-port replication information of the message and the inner-port replication information of the message comprises:
   the inter-port replication module acquiring the cache address of the message and a multicast identification ID of the message from the message cache module;
   acquiring the inter-port replication information and the inner-port replication information from a preset multicast replication table according to the multicast identification ID, wherein, the multicast replication table comprises inter-port replication information and inner-port replication information corresponding to every multicast ID, the inter-port replication information comprises: a port to which every cache address needs to be replicated; and the inner-port replication information comprises: a number of copies of the messages required to be replicated in every port according to every cache address.

3. The method according to claim 2, wherein, the step of the port queue module outputting a cache address for which message replication needs to be performed according to the stored corresponding inner-port replication information under the scheduling by the port scheduling module comprises:
   step 21. under the scheduling by the port scheduling module, the port queue module outputting the cache address corresponding to the message required to be replicated currently, and updating the corresponding inner-port replication information in the port queue module;
   step 22. the port queue module judging whether the replication for the message required to be replicated in a port corresponding to the cache address is completed according to the inner-port replication information; if not, continuing outputting the cache address corresponding to the message required to be replicated currently, until the replication for the message required to be replicated currently is completed; and if yes, proceeding to step 23; and
   step 23. if the port queue module determines that the replication for the message required to be replicated currently is already completed, executing steps 21-23, until replication for messages of all ports is completed.

4. The method according to claim 2, further comprising:
   a cache address recycling module acquiring a total number of the copies of the message corresponding to every cache address through the inter-port replication module, and updating a number of the copies of the message which have already been replicated every time the cache address de-queues; and
   the cache address recycling module comparing the total number of the copies of the message with the number of the copies of the message which have already been replicated, if equal, recycling a cache address corresponding to that message for which the replication is completed, notifying the cache address which is already recycled to the message cache module and clearing the number of the copies of that message for which the replication is completed as 0.

5. The method according to claim 1, wherein, the step of the port queue module outputting a cache address for which message replication needs to be performed according to the stored corresponding inner-port replication information under the scheduling by the port scheduling module comprises:
   step 21. under the scheduling by the port scheduling module, the port queue module outputting the cache address corresponding to the message required to be replicated currently, and updating the corresponding inner-port replication information in the port queue module;
   step 22. the port queue module judging whether the replication for the message required to be replicated in a port corresponding to the cache address is completed according to the inner-port replication information; if not, continuing outputting the cache address corresponding to the message required to be replicated currently, until the replication for the message required to be replicated currently is completed; and if yes, proceeding to step 23; and step 23. if the port queue module determines that the replication for the message required to be replicated currently is already completed, executing steps 21-23, until replication for messages of all ports is completed.

6. The method according to claim 5, wherein, a mutually-independent port queue corresponding to every port is set in the port queue module, the port queue module adopts a list structure to store the cache address received by the corresponding port queue and the number of the copies of the messages required to be replicated according to the cache address, and the port queue module comprises: a queue head, a queue body, and a queue end; wherein, the queue head stores a queue head pointer of every port queue, the cache address corresponding to the message required to be replicated currently, and the number of the copies of the messages required to be replicated according to the cache address; the queue head pointer is used for storing an address of a next cache address in the queue of the present port; the queue body stores, besides the cache address corresponding to the message required to be replicated currently and the number of the copies of the message required to be replicated according to the cache address, another cache address received by every port queue and a number of copies of the message required to be replicated according to that cache address; and the queue end stores a queue end pointer of every port queue, and the queue end pointer indicates a write address by which the other received cache address and the number of the copies of the message required to be replicated according to that cache address are written into the corresponding queue body in every port queue.

7. The method according to claim 6, wherein, the step of transmitting the replicated cache address and the corresponding inner-port replication information to the port queue module to be stored comprises that:

at first the port queue module writes the queue head pointer, the cache address corresponding to the message required to be replicated currently, and the number of the copies of the message required to be replicated according to the cache address of every port queue into the queue head, writes the queue end pointer of every port queue into the queue end, and writes the other received cache address of every port queue and the number of the copies of the message required to be replicated according to that cache address into the queue body according to the write address indicated by the queue end pointer.

8. The method according to claim 7, wherein, the step of the port queue module outputting the cache address corresponding to the message required to be replicated currently, and updating the corresponding inner-port replication information in the port queue module under the scheduling by the port scheduling module comprises:

under the scheduling by the port scheduling module, the port queue module reading the cache address corresponding to the message required to be replicated currently stored in the port queue from the queue head for outputting, updating the number of the copies of the message required to be replicated according to the cache address every time the cache address de-queues, in a case that it is determined that the replication for the current message required to be replicated is already completed according to the number of the copies of the message required to be replicated according to the cache address, reading a next cache address and a number of copies of the message required to be replicated according to that cache address from the queue body according to the queue head pointer of the port queue, and writing into the port queue of the queue head.

9. The method according to claim 1, further comprising:

a cache address recycling module acquiring a total number of the copies of the message corresponding to every cache address through the inter-port replication module, and updating a number of the copies of the message which have already been replicated every time the cache address de-queues; and the cache address recycling module comparing the total number of the copies of the message with the number of the copies of the message which have already been replicated, if equal, recycling a cache address corresponding to that message for which the replication is completed, notifying the cache address which is already recycled to the message cache module and clearing the number of the copies of that message for which the replication is completed as 0.

10. A multicast message replication apparatus, comprising a message cache module, an inter-port replication module, a port queue module and a port scheduling module, wherein:

the message cache module is configured to: store a received message, and read a corresponding message according to a cache address output by the port queue module and output;

the inter-port replication module is configured to: acquire a cache address of the message, inter-port replication information of the message, and inner-port replication information of the message, replicate the cache address according to the inter-port replication information, and transmit the replicated cache address and the corresponding inner-port replication information to the port queue module;

the port queue module is configured to: store the received cache address and the corresponding inner-port replication information, output a cache address for which message replication needs to be performed according to the stored corresponding inter-port replication information under scheduling by the port scheduling module; and the port scheduling module is configured to: schedule the cache addresses of the port queue module.

11. The apparatus according to claim 10, wherein, the inter-port replication module is configured to acquire the cache address of the message, the inter-port replication information of the message and the inner-port replication information of the message by means of:

acquiring the cache address of the message and a multicast identification ID of the message from the message cache module; and acquiring the inter-port replication information and the inner-port replication information from a preset multicast replication table according to the multicast identification ID;

wherein, the multicast replication table comprises inter-port replication information and inner-port replication information corresponding to every multicast ID;

the inter-port replication information comprises: a port to which every cache address needs to be replicated; and the inner-port replication information comprises: a number of copies of the message required to be replicated in every port according to every cache address.

12. The apparatus according to claim 11, wherein, the port queue module comprises an outputting submodule and a judgment submodule, wherein:

the outputting submodule is configured to: under the scheduling by the port scheduling module, output the cache address corresponding to the message required to be replicated currently, and update the corresponding inner-port replication information in the port queue module; and the judgment submodule is configured to: judge whether the replication for the message required to be replicated in a port corresponding to the cache address is completed according to the replication information; if not, continue calling the outputting submodule to output the cache address corresponding to the message required to be replicated currently until the replication for the message required to be replicated currently is completed; and if yes, call the outputting submodule and the judgment submodule until replication for messages of all ports is completed.

13. The apparatus according to claim 11, further comprising a cache address recycling module, wherein:

the cache address recycling module is configured to: acquire a total number of the copies of the message corresponding to every cache address through the inter-port replication module, and update a number of copies of the message which have already been replicated every time the cache address de-queues; and compare the total number of the copies of the messages with the number of the copies of the message which have already been replicated, if equal, then recycle a cache address corresponding to that message for which the replication is completed, notify the cache address which is already recycled to the message cache module and clear the number of the copies of that message for which the replication is completed as 0.

14. The apparatus according to claim 10, wherein, the port queue module comprises an outputting submodule and a judgment submodule, wherein:

the outputting submodule is configured to: under the scheduling by the port scheduling module, output the cache address corresponding to the message required to be replicated currently, and update the corresponding inner-port replication information in the port queue module; and the judgment submodule is configured to: judge whether the replication for the message required to be replicated in a port corresponding to the cache address is completed according to the replication information; if not, continue calling the outputting submodule to output the cache address corresponding to the message required to be replicated currently until the replication for the message required to be replicated currently is completed; and if yes, call the outputting submodule and the judgment submodule until replication for messages of all ports is completed.

15. The apparatus according to claim 14, wherein, a mutually-independent port queue corresponding to every port is set in the port queue module, the port queue module adopts a list structure to store the cache address received by the corresponding port queue and the number of copies of the message required to be replicated according to the cache address, and the port queue module comprises: a queue head, a queue body, and a queue end; wherein, the queue head stores a queue head pointer of every port queue, the cache address corresponding to the message required to be replicated currently, and the number of the copies of the message required to be replicated according to the cache address; the queue head pointer is used for storing an address of a next cache address in the queue of the present port; the queue body stores, besides the cache address corresponding to the message required to be replicated currently and the number of the copies of the message required to be replicated according to the cache address, another cache address received by every port queue and a number of copies of the message required to be replicated according to that cache address; and the queue end stores a queue end pointer of every port queue, and the queue end pointer indicates a write address by which the other received cache address and the number of the copies of the message required to be replicated according to that cache address are written into the corresponding queue body in every port queue.

16. The apparatus according to claim 15, wherein, the port queue module further comprises a storage submodule, wherein:

the storage submodule is configured to: at first write the queue head pointer, the cache address corresponding to the message required to be replicated currently, and the number of the copies of the message required to be replicated according to the cache address of every port queue into the queue head, write the queue end pointer of every port queue into the queue end, and write the other received cache address of every port queue and the number of the copies of the message required to be replicated according to that cache address into the queue body according to the write address indicated by the queue end pointer.

17. The apparatus according to claim 16, wherein, the outputting submodule is configured to output the cache address corresponding to the message required to be replicated currently and update the corresponding inner-port replication information in the port queue module under the scheduling by the port scheduling module by means of:

under the scheduling by the port scheduling module, reading the cache address corresponding to the message required to be replicated currently stored in the port queue from the queue head for outputting, updating the number of the copies of the message required to be replicated according to the cache address every time the cache address de-queues, in a case that it is determined that the replication for the current message required to be replicated is already completed according to the number of the copies of the message required to be replicated according to the cache address, reading a next cache address and a number of copies of the message required to be replicated according to that cache address from the queue body according to the queue head pointer of the port queue, and writing into the port queue of the queue head.

18. The apparatus according to claim 10, further comprising a cache address recycling module, wherein:

the cache address recycling module is configured to: acquire a total number of the copies of the message corresponding to every cache address through the inter-port replication module, and update a number of copies of the message which have already been replicated every time the cache address de-queues; and compare the total number of the copies of the messages with the number of the copies of the message which have already been replicated, if equal, then recycle a cache address corresponding to that message for which the replication is completed, notify the cache address which is already recycled to the message cache module and clear the number of the copies of that message for which the replication is completed as 0.

* * * * *